US006864398B2

(12) United States Patent
O'Rear (10) Patent No.: US 6,864,398 B2
(45) Date of Patent: Mar. 8, 2005

(54) CONVERSION OF SYNGAS TO DISTILLATE FUELS

(75) Inventor: Dennis J. O'Rear, Petaluma, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 245 days.

(21) Appl. No.: 10/034,241

(22) Filed: Dec. 28, 2001

(65) Prior Publication Data

US 2002/0111521 A1 Aug. 15, 2002

Related U.S. Application Data

(63) Continuation-in-part of application No. 09/542,115, filed on Apr. 3, 2000, now abandoned.

(51) Int. Cl.[7] .................................................. C07C 1/04
(52) U.S. Cl. .................... 585/324; 585/316; 585/327; 585/329
(58) Field of Search ............................... 585/324, 316, 585/327, 329

(56) References Cited

U.S. PATENT DOCUMENTS

| | | |
|---|---|---|
| 3,140,249 A | 7/1964 | Plank et al. |
| 3,140,251 A | 7/1964 | Plank et al. |
| 3,140,253 A | 7/1964 | Plank et al. |
| 3,702,886 A | 11/1972 | Argauer et al. |
| 3,709,979 A | 1/1973 | Chu |
| 3,770,614 A | 11/1973 | Graven |
| 3,832,449 A | 8/1974 | Rosinski et al. |
| 3,852,207 A | 12/1974 | Stangeland et al. |
| 3,856,876 A | 12/1974 | Burnett |
| 3,904,513 A | 9/1975 | Fischer et al. |
| 3,948,758 A | 4/1976 | Bonacci et al. |
| 3,960,978 A | 6/1976 | Givens et al. |
| 4,016,218 A | 4/1977 | Haag et al. |

(List continued on next page.)

FOREIGN PATENT DOCUMENTS

| | | |
|---|---|---|
| EP | 0015132 A1 | 9/1980 |
| EP | 0609079 A1 | 8/1994 |
| GB | 975454 | 11/1964 |

OTHER PUBLICATIONS

Anderson et al., *Reactions on ASM–5–Type Zeolite Catalysts, Journal of Catalysis*, 58, 1979, pp. 114–130, Academic Press, Inc., New York and London, subdsidiary of Harcourt Brace Jovanovich.

Breck, Donald W., "Absorption by dehydrated Zeolite Crystals", Chapter 8, *Zeolite Molecular Sieves*, 8, 1974, pp. 593–724, A Wiley–Interscience Publication, John Wiley & Sons, N.Y.

(List continued on next page.)

*Primary Examiner*—Thuan D. Dang
(74) *Attorney, Agent, or Firm*—Burns, Doane, Swecker & Mathis, L.L.P.

(57) ABSTRACT

An integrated process for producing high value products, including for example distillate fuel, from syngas is disclosed. The integrated process of the present invention produces high value products from a Fischer Tropsch with minimal production of low value products, including methane. In a process of the present invention, syngas is reacted under low temperature Fischer-Tropsch reaction conditions to provide a hydrcarbon product stream comprising substantially waxy products. The waxy products are subjected to an olefin-selective paraffin cracking process, preferably in a Paragon reactor to form olefins. The resulting olefins are then subjected to oligomerization conditions to form iso-olefins. In the processes of the present invention, the hydrocarbon product stream from the Fischer Tropsch reaction comprises desirable low levels of methane, preferably below 10%.

10 Claims, 1 Drawing Sheet

U.S. PATENT DOCUMENTS

| | | |
|---|---|---|
| 4,016,245 A | 4/1977 | Plank et al. |
| 4,039,302 A | 8/1977 | Khera |
| 4,042,614 A | 8/1977 | Vannice et al. |
| 4,061,724 A | 12/1977 | Grose et al. |
| 4,076,842 A | 2/1978 | Plank et al. |
| 4,077,995 A | 3/1978 | Khera |
| 4,088,671 A | 5/1978 | Kobylinski |
| RE29,948 E | 3/1979 | Dwyer et al. |
| 4,151,190 A | 4/1979 | Murchison et al. |
| 4,157,294 A | 6/1979 | Iwao et al. |
| 4,171,320 A | 10/1979 | Vannice et al. |
| 4,229,424 A | 10/1980 | Kokotailo |
| 4,238,318 A | 12/1980 | Kouwenhoven et al. |
| 4,251,348 A | 2/1981 | O'Rear et al. |
| 4,282,085 A | 8/1981 | O'Rear et al. |
| 4,347,121 A | 8/1982 | Mayer et al. |
| 4,390,413 A | 6/1983 | O'Rear et al. |
| 4,414,423 A | 11/1983 | Miller |
| 4,417,086 A | 11/1983 | Miller |
| 4,417,087 A | 11/1983 | Miller |
| 4,417,088 A | 11/1983 | Miller |
| 4,420,649 A | 12/1983 | Antos |
| 4,423,268 A | 12/1983 | Miller |
| 4,423,269 A | 12/1983 | Miller |
| 4,436,614 A | 3/1984 | Olbrich et al. |
| 4,465,788 A | 8/1984 | Miller |
| 4,476,344 A | 10/1984 | Kimble |
| 4,482,646 A | 11/1984 | Eastman et al. |
| 4,502,945 A | 3/1985 | Olbrich et al. |
| 4,507,517 A | 3/1985 | Devries et al. |
| 4,511,746 A | 4/1985 | Miller |
| 4,538,012 A | 8/1985 | Miller |
| 4,542,251 A | 9/1985 | Miller |
| 4,551,438 A | 11/1985 | Miller |
| 4,568,663 A | 2/1986 | Mauldin |
| 4,599,474 A | 7/1986 | Devries et al. |
| 4,608,450 A | 8/1986 | Miller |
| 4,622,308 A | 11/1986 | Koikeda et al. |
| 4,684,756 A | 8/1987 | Derr, Jr. et al. |
| 4,686,316 A | 8/1987 | Morrison |
| 4,704,487 A | 11/1987 | Devries et al. |
| 4,704,493 A | 11/1987 | Devries et al. |
| 4,709,108 A | 11/1987 | Devries et al. |
| 4,734,537 A | 3/1988 | Devries et al. |
| 4,751,342 A | 6/1988 | Kimble |
| 4,777,319 A | 10/1988 | Kung et al. |
| 4,778,942 A | 10/1988 | Vora et al. |
| 4,798,911 A | 1/1989 | Lentz et al. |
| 4,810,357 A | 3/1989 | Chester et al. |
| 4,814,533 A | 3/1989 | Devries et al. |
| 4,814,534 A | 3/1989 | Devries et al. |
| 4,814,538 A | 3/1989 | Devries et al. |
| 4,827,066 A | 5/1989 | Herber et al. |
| 5,348,982 A | 9/1994 | Herbolzheimer et al. |
| 5,545,674 A | 8/1996 | Behrmann et al. |
| 5,792,896 A | 8/1998 | Randolph et al. |
| 5,929,297 A | 7/1999 | Theriot et al. |
| 5,942,642 A | 8/1999 | Beyer et al. |
| 5,960,643 A | 10/1999 | Kuechler et al. |
| 6,002,060 A | 12/1999 | Sarin et al. |
| 6,013,851 A | 1/2000 | Verrelst et al. |

OTHER PUBLICATIONS

Collins, C., et al., *Trends in NGL Recovery for Natural and Associated Gases*, GasTech LNG/LPG Conference 84, GasTech, Ltd. of Rickmansworth, England, 1985, pp. 287–303, Published by Gastech Ltd., Herts, England.

Deckwer, W-D., et al. *Modeling the Fischer–Tropsc Synthesis in the Slurry Phase, Industrial& Engineering Chemistry*, vol. 21, No. 2, Apr. 1982, pp. 231–241, The American Chemical Society.

Kölbel, H., et al., *The Fischer–Tropsch Synthesis in the Liquid Phase, Catal. Rev. Sci. Eng.*, vol. 21, No. 2, 1980, pp. 225–274, Marcel Dekker, Inc, New York.

Ramachandran, et al., *Bubble Column Slurry Reactor, Three–Phase Catalytic Reactors*, Chapter 10, 1983, pp. 308–332, Gordon and Breach Science Publishers, New York.

Shah, Y., et al., *Design Parameters Estimations for Bubble Column Reactors, AIChE Journal*, vol. 28, No. 3, May 1982, pp. 353–379, The American Institute of Chemical Engineers.

Figure

CONVERSION OF SYNGAS TO DISTILLATE FUELS

RELATED APPLICATIONS

The present application is a continuation-in-part of U.S. application Ser. No. 09/542,115, "Improved Conversion of Syngas to Distillate Fuels," filed Apr. 3, 2000 now abandoned.

FIELD OF THE INVENTION

The present invention relates to integrated processes for preparing high value products from a Fischer Tropsch process with minimal production of low value products, including methane.

BACKGROUND OF THE INVENTION

The majority of commercially available distillate fuels are derived from crude oil. Crude oil is in limited supply, and fuel derived from crude oil is often contaminated with sulfur and nitrogen compounds that contribute to acid rain. For these reasons, efforts have focused on methods for forming distillate fuels from feedstocks other than crude oil.

Several methods have been developed for converting natural gas to distillate fuels. One method involves converting methane to methanol, and then converting the methanol to higher molecular weight products. Another method involves converting methane to synthesis gas ("syngas"), a mixture of carbon monoxide and hydrogen gas, and subjecting the syngas to Fischer-Tropsch synthesis. In the Fischer-Tropsch synthesis process, liquid and gaseous hydrocarbons are formed by contacting syngas with a Fischer-Tropsch catalyst under suitable process conditions. Fischer-Tropsch synthesis processes produce a spectrum of hydrocarbons from methane, ethane and low molecular weight olefins to high molecular weight waxes, depending on the type of catalyst used and the process conditions selected, by way of example, the temperature, syngas ratio and other variables.

The low molecular weight olefins can be oligomerized, and the waxes can be hydrocracked, with the products optionally isomerized, to provide hydrocarbons useful in gasoline compositions. The feedstock to the hydrocracker may need to be hydrotreated to remove oxygenates. Both the hydrotreating and hydrocracking steps require the use of hydrogen and are performed at relatively high temperatures and pressures. Methane and ethane are low value products from the Fischer Tropsch process, and since they are feeds for the syngas generator, these products are typically recycled. Recycling of the methane and ethane may be difficult, capital intensive, and reduce the efficiency of the Fischer Tropsch conversion process. Therefore, it is undesirable to produce large amounts of methane in the Fischer-Tropsch reaction. Typically, yields of methane above 10% are economically unacceptable in a Fischer Tropsch process.

Fischer Tropsch processes and processes for upgrading hydrocarbon products are known in the art. By way of example, U.S. Pat. No. 4,502,945 ('945) to Olbrich et al. discloses a process for producing olefins from normal paraffins and slightly branched paraffins by contacting a feed of the paraffins with an intermediate pore size zeolite. U.S. Pat. No. 4,622,308 to Koideda et al. discloses a Fischer-Tropsch process for producing hydrocarbons from syngas using a catalyst that comprises a combination of an iron-containing Fischer-Tropsch catalyst, a zeolite, and at least one metal selected from the group consisting of ruthenium, rhodium, platinum, palladium, iridium, cobalt, and molybdenum. However, the catalyst of Koideda results in the formation of relatively high amounts of methane.

Accordingly, there exists a need for integrated Fischer Tropsch processes that produce relatively high amounts of high value products (i.e., hydrocarbons useful in gasoline compositions) and relatively low amounts of low value products (i.e., methane).

SUMMARY OF THE INVENTION

The present invention is directed to integrated processes for preparing high value products from a Fischer Tropsch process with minimal production of low value products, such as methane.

One aspect of the present invention relates to an integrated process for preparing iso-olefins from syngas including a Fischer Tropsch process. The integrated process comprises subjecting the syngas to low temperature Fischer-Tropsch reaction conditions in the presence of a Fischer-Tropsch catalyst to form a hydrocarbon product stream comprising substantially waxy products. The waxy products are isolated from the hydrocarbon product stream and the waxy products are subjected to olefin-selective paraffin cracking conditions, preferably in a Paragon reactor. In the olefin-selective paraffin cracking conditions, the waxy products are contacted with a stable olefin-selective paraffin cracking catalyst, preferably a catalyst comprising an intermediate pore size silicaceous crystalline molecular sieve having a silica:alumina mole ratio from about 25:1 to about 500:1. The olefin selective paraffin cracking conditions form $C_{3-5}$ olefins. The $C_{3-5}$ olefins are oligomerized to form a hydrocarbon product comprising iso-olefins. The low temperature Fischer Tropsch reaction forms a hydrocarbon product stream that comprises low levels of methane, preferably less than 10% methane, more preferably less than 5% methane, and most preferably less than 2% methane.

An additional aspect of the present invention relates to an integrated process for preparing a distillate fuel blend component. The process comprises subjecting syngas to low temperature Fischer-Tropsch reaction conditions in the presence of a Fischer-Tropsch catalyst to form a hydrocarbon product stream comprising substantially waxy products. The waxy products are isolated from the hydrocarbon product stream and are subjected to olefin-selective paraffin cracking conditions, preferably in a Paragon reactor. In the olefin-selective paraffin cracking conditions, the waxy products are contacted with a stable olefin-selective paraffin cracking catalyst, preferably a catalyst comprising an intermediate pore size silicaceous crystalline molecular sieve having a silica:alumina mole ratio from about 25:1 to about 500:1. The olefin selective paraffin cracking conditions form $C_{3-5}$ olefins. The $C_{3-5}$ olefins are oligomerized to form a hydrocarbon product comprising iso-olefins, and the hydrocarbon product is distilled to provide distillate-boiling iso-olefins. The distillate-boiling iso-olefins may be added to a distillate fuel composition. Preferably, at least a portion of the distillate fuel composition is also from a Fischer Tropsch process. The low temperature Fischer Tropsch reaction forms a hydrocarbon product stream that comprises low levels of methane, preferably less than 10% methane, more preferably less than 5% methane, and most preferably less than 2% methane.

A further aspect of the present invention relates to an integrated process for preparing distillate fuel from syngas. The process comprises converting methane and ethane to syngas in a syngas generator and subjecting the syngas to low temperature Fischer-Tropsch reaction conditions in the presence of a Fischer Tropsch catalyst to form a hydrocarbon product stream comprising substantially waxy products. The remaining portion of the hydrocarbon product stream may comprise varying amounts of $C_{2-}$ products (i.e., methane, CO, $H_2$, and the like), $C_{3-5}$ olefins, distillate fuel, and naphtha. Fractions are isolated from the hydrocarbon product stream in an isolation unit. The fractions that may be isolated comprise a $C_{2-}$ fraction; a $C_{3-5}$ olefin fraction; a distillate fuel fraction; and a waxy fraction.

The waxy fraction is subjected to olefin-selective paraffin cracking conditions, preferably in a Paragon reactor. In the olefin-selective paraffin cracking conditions, the waxy products are contacted with a stable olefin-selective paraffin cracking catalyst, preferably a catalyst comprising an intermediate pore size silicaceous crystalline molecular sieve having a silica:alumina mole ratio from about 25:1 to about 500:1. The olefin selective paraffin cracking conditions form $C_{3-5}$ olefins. These $C_{3-5}$ olefins are blended with the $C_{3-5}$ olefin fraction to form blended $C_{3-5}$ olefins, and the blended $C_{3-5}$ olefins are oligomerized in an oligomerization reactor to form a hydrocarbon product comprising iso-olefins. The iso-olefins are recycled to the isolation unit, and the $C_{2-}$ fraction is recycled to the Fischer Tropsch reactor, and optionally, to the syngas generator. The iso-olefins are combined with the distillate fuel fraction and optionally the naphtha fraction to provide a distillate fuel composition. The low temperature Fischer Tropsch reaction forms a hydrocarbon product stream that comprises low levels of methane, preferably less than 10% methane, more preferably less than 5% methane, and most preferably less than 2% methane.

Other objects and advantages of the invention will become apparent to those skilled in the art from a review of the ensuing description, which proceeds with reference to the following illustrative drawing.

DETAILED DESCRIPTION OF THE INVENTION

The present invention relates to integrated processes for preparing high value products from a Fischer Tropsch process with minimal production of low value products, such as methane. The high value products, which may be prepared according to the methods of the present invention, include iso-olefins, distillate fuel blend component, distillate fuel compositions, and the like. According to the integrated processes of the present invention these high value products may be prepared with minimal production of methane.

Definitions

The following terms will be used throughout the specification and will have the following meanings unless otherwise indicated.

The term "hydrocarbon" means any product containing hydrogen and carbon atoms, and may also contain heteroatoms such as oxygen, sulfur, nitrogen, and the like.

The term "paraffin" means any saturated hydrocarbon compound, i.e., an alkane.

The term "isoparaffin" means any branched chain saturated hydrocarbon compound and does not include normal paraffins or cycloparaffins.

The term "olefin" means any unsaturated hydrocarbon having one or more double bonds, i.e., an alkene.

The term "iso-olefin" means any branched chain unsaturated hydrocarbon having one or more double bonds. Iso-olefins do not include normal olefins or cyclo-olefins. Representative examples include isobutylene, isoprene, and the like.

The term "distillate fuel/distillate fuel fraction" means a hydrocarbon with boiling points between about 250° F. and 1100° F., preferably 300° F. and 700° F. The term "distillate" means that typical conventional fuels of this type can be generated from vapor overhead streams of petroleum crude distillation. In contrast, residual fuels cannot be generated from vapor overhead streams of petroleum crude distillation, and are a non-vaporizable remaining portion. Within the broad category of distillate fuels are specific fuels that include: naphtha, jet fuel, diesel fuel, kerosene, aviation gasoline, fuel oil, and blends thereof. Distillate fuel as used herein may mean distillate fuels prepared by Fischer Tropsch processes as well as distillate fuels generated from conventional petroleum crude distillation as appropriate in the context.

A salable distillate fuel is a distillate fuel meeting the specifications for naphtha, jet fuel, diesel fuel, kerosene, aviation gas, fuel oil, and blends thereof.

The term "distillate fuel blend component" is a component, which can be used with other components, to form a salable distillate fuel meeting at least one of the specifications for naphtha, jet fuel, diesel fuel, kerosene, aviation gas, fuel oil, and blends thereof, especially diesel fuel or jet fuel, and most especially diesel fuel. The distillate fuel blend component by itself does not need to meet all specifications for the distillate fuel, only the salable distillate fuel needs to meet the specifications. The proportion of distillate fuel additive in the salable distillate fuel may be 10%, more preferably 25%, and most preferably 50%.

The term "distillate-boiling iso-olefins" are iso-olefins that when blended with a distillate fuel component results in a blend that has an acceptable flash point as determined by distillate fuel specifications.

The term "waxy fraction/stream/product" means a product derived from a Fischer Tropsch process generally boiling above 600° F., preferably above 650° F. The Fischer Tropsch waxy products are generally $C_{20}+$ products, with decreasing amounts down to $C_{10}$, and as such are too heavy and have too high of a pour/cloud point to be included in a distillate fuel or blend component. Fischer Tropsch waxy products generally comprise >70% normal paraffins, and often greater than 80% normal paraffins.

"Substantially waxy product" refers to a hydrocarbon product comprised of at least 75% waxy product, preferably greater than 90% waxy product, and more preferably greater than 95% waxy product.

"Syngas" means a mixture of gases that includes hydrogen and carbon monoxide. In addition to these species, others may be present, including for example, water, carbon dioxide, unconverted light hydrocarbon feedstock, and various impurities.

The term "naphtha" is typically the $C_5$ to 400° F. (204° C.) endpoint fraction of available hydrocarbons. The boiling point ranges of the various product fractions recovered in any particular refinery or synthesis process will vary with such factors as the characteristics of the source, local markets, product prices, etc. Reference is made to ASTM D-3699-83 and D-3735 for further details on kerosene and naphtha fuel properties.

A diesel fuel is a material suitable for use in diesel engines and conforming to at least one of the following specifications:

ASTM D 975—"Standard Specification for Diesel Fuel Oils"

European Grade CEN 90.

Japanese Fuel Standards JIS K 2204.

The United States National Conference on Weights and Measures (NCWM) 1997 guidelines for premium diesel fuel.

The United States Engine Manufacturers Association recommended guidelines for premium diesel fuel (FQP-1A).

A jet fuel is a material suitable for use in turbine engines for aircraft or other uses meeting at least one of the following specifications:

ASTM D1655.

DEF STAN 91-91/3 (DERD 2494), TURBINE FUEL, AVIATION, KEROSENE TYPE, JET A-1, NATO CODE: F-35.

International Air Transportation Association (IATA) Guidance Materials for Aviation, $4^{th}$ edition, March 2000.

The term "integrated process" means a process comprising a sequence of steps, some of which may be parallel to other steps in the process, but which are interrelated or somehow dependent upon either earlier or later steps in the total process.

The present invention is directed to an integrated process for producing high value products from a Fischer Tropsch process, for example, iso-olefins, distillate fuel additives and distillate fuels. The present invention advantageously produces these high value products while producing minimal amounts of low value products, for example, methane. It has been surprisingly discovered that an integrated process comprising a low temperature Fischer Tropsch reaction followed by an olefin-selective paraffin cracking process, preferably in a Paragon reactor, may be used to efficiently and economically produce desired iso-olefins, distillate fuel blend components, and distillate fuels. Performing a Fischer Tropsch process under low temperature reaction conditions produces a hydrocarbon product stream comprising substantially waxy products and minimal amounts of methane. The remaining portion of the hydrocarbon product stream may comprise varying amounts of a $C_{3-5}$ olefin fraction, a distillate fuel fraction, and a naphtha fraction.

The hydrocarbon product stream from the low temperature Fischer Tropsch process comprises substantially waxy products, preferably 75% waxy products, more preferably 90% waxy products, and most preferably 95% waxy products. Although the waxy products are not desired high value products, the product stream from the low temperature Fischer Tropsch reaction is subjected to an olefin-selective paraffin cracking process, preferably in a Paragon reactor, to provide a mixture of light olefins and a small amount of light paraffins. The olefin-selective paraffin cracking process is used to convert a waxy hydrocarbon feed to light olefins. It has been discovered that the product stream from the low temperature Fischer Tropsch reaction comprising substantially waxy products and minimal amounts of methane provides a superior feed for a Paragon reactor. A Paragon reactor may operate more efficiently and economically with minimal amounts of methane in the feed to the reactor, and in the processes of the present invention, minimal amounts of methane in the hydrocarbon feed may be achieved without high costs associated with large amounts of methane recycle. According to the present invention the light olefins formed from the olefin-selective paraffin cracking process, preferably in a Paragon reactor, may be oligomerized to form valuable iso-olefins.

Although the integrated processes of the present invention may have more processing steps than other potential processes to form light olefins or iso-olefins, the efficiency and economic advantages may outweigh the additional processing steps. By way of example, performing a Fischer Tropsch reaction under conditions to optimize formation of light olefins, for example using a catalyst that provides low chain growth probabilities, produces a hydrocarbon product stream comprising large amounts of methane. In addition, reacting syngas over a catalyst mixture comprising a Fischer Tropsch catalyst component and a zeolite component to produce light olefins and iso-olefins also produces large amounts of methane. In these processes it becomes necessary to recycle the large amounts of methane produced to the Fischer Tropsch reactor and optionally the syngas generator. As the quantity of methane increases, the costs associated with the methane recycle become quite large and the processes become economically unfeasible. Accordingly to the present invention, yields of methane above approximately 10% are generally unacceptable from an economic standpoint.

Accordingly, it has been surprisingly discovered that a low temperature Fischer Tropsch process may be advantageously integrated with an olefin-selective paraffin cracking process, preferably performed in a Paragon reactor, to produce desirable light olefins and iso-olefins with minimal methane production. This combination provides the desired high value products from the Fischer Tropsch reaction process with minimal costs due to methane recycle.

Integrated Processes

According to the integrated processes of the present invention, methane and ethane, preferably derived from a natural gas source, may be sent through a syngas generator to form syngas. A low temperature Fischer-Tropsch process is performed to convert the syngas to a hydrocarbon product stream comprising substantially waxy products. The waxy products are substantially paraffins and are highly linear. The remaining portion of the hydrocarbon product stream may comprise varying amounts of a $C_{3-5}$ olefin fraction, a distillate fuel fraction, and a naphtha fraction. The hydrocarbon product stream from the Fischer Tropsch reaction includes low levels of nitrogen and sulfur.

The hydrocarbon product stream may separated into various fractions, including, a $C_2$- fraction (a methane/ethane fraction which also comprises unreacted CO and $H_2$), a $C_{3-5}$ olefin fraction, a naphtha fraction, a distillate fuel fraction, and a waxy products fraction. The $C_2$- fraction may be recycled to the Fischer Tropsch reactor and optionally to the syngas generator. The $C_{3-5}$ olefin fraction may be oligomerized to form iso-olefins. The naphtha and distillate fuel fractions may be isolated, and optionally hydrotreated to reduce the olefin concentration and/or isomerized to increase the octane value and/or to lower the pour point.

The waxy products fraction are subjected to an olefin-selective paraffin cracking process, preferably performed in a Paragon reactor to form additional $C_{3-5}$ olefins. The $C_{3-5}$ olefins from the Paragon reactor include primarily propene, n-butene, isobutene, n-pentene and iso-pentene. The $C_{3-5}$ olefins from the Paragon reactor may be oligomerized to provide iso-olefins. The products of the oligomerization tend to be highly branched iso-olefins. The iso-olefins may be used as a distillate fuel additive or as a distillate fuel component. The iso-olefins optionally may be reduced with hydrogen to form iso-paraffins. The source of the hydrogen for the reduction of the iso-olefins may be from the syngas. Using the syngas as the source of hydrogen may avoid the need to establish a separate hydrogen plant.

Figure 1:
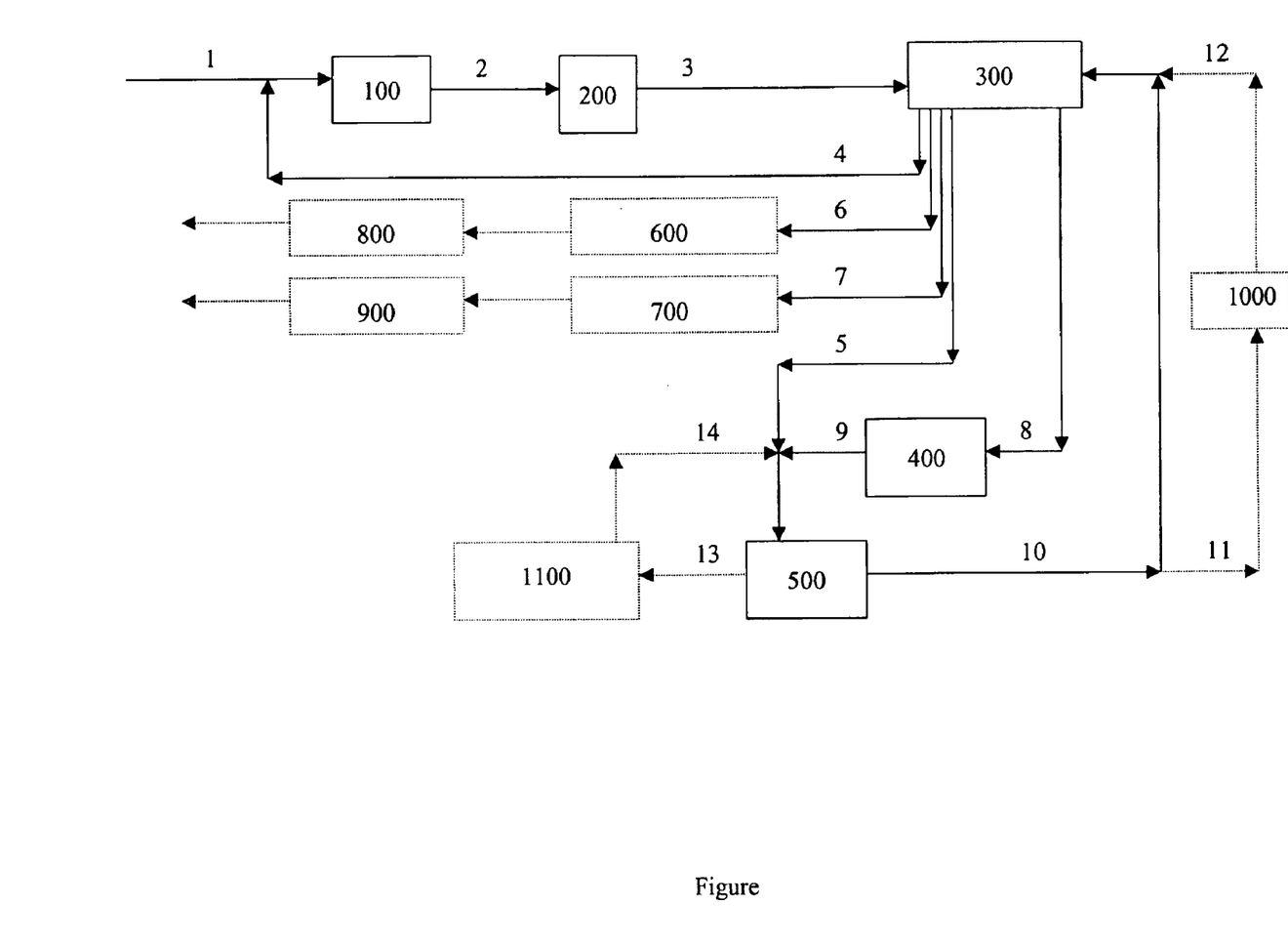
The FIGURE illustrates exemplary systems for conducting the integrated processes of the present invention using feedstocks from Fischer Tropsch processes to obtain desired high value products and minimal amounts of methane.

The process may readily be understood by referring to the block diagram in the FIGURE.

The FIGURE illustrates an integrated process for making high value products from a Fischer Tropsch process with minimal amounts of methane produced. As shown in the integrated process, a methane and ethane feed 1 are utilized as the feedstock to a syngas generator 100 to form a syngas feed 2. The syngas feed 2 is then utilized as the feedstock to a Fischer-Tropsch reactor 200 operating at low temperature conditions to form a hydrocarbon product stream 3 comprising substantially waxy products and minimal amounts of methane.

The resulting hydrocarbon product stream 3 is fed into an isolation unit 300, from which various fractions may be isolated. These fractions include, but are not limited to, a $C_{2-}$ fraction 4, a $C_{3-5}$ olefin fraction 5, a naphtha fraction 6, a distillate fuel fraction 7, and a waxy fraction 8.

The isolated $C_{2-}$ fraction 4 is recycled and used as a feed to the Fischer-Tropsch reactor 200, and a portion may optionally be used as a feed to the syngas generator 100. The isolated $C_{3-5}$ olefin fraction 5 is utilized as a feed to an oligomerization reactor 500. The isolated naphtha fraction 6 is utilized as a feedstock to the optional hydrotreating step 600 and/or to the optional isomerization step 800. The isolated distillate fuel fraction 7 is utilized as a feedstock to the optional hydrotreating step 700 and/or to the optional isomerization step 900.

The isolated waxy fraction 8 is utilized as a feed to a Paragon reactor 400 to provide a mixture of light olefins and a small amount of light paraffins 9. The mixture of light olefins and small amount of light paraffins 9 is utilized as a feed to the oligomerization reactor 500 to provide an iso-olefins feed 10. The oligomerization reactor to which the mixture 9 is fed may be the same oligomerization reactor 500 to which the $C_{3-5}$ olefin fraction 5 isolated from the isolation unit 300 is fed or it may be a different oligomerization reactor. Preferably it is the same oligomerization reactor. The iso-olefins feed 10 is recycled to the isolation unit 300.

A portion of the iso-olefins 11 optionally may be utilized as a feed to the hydrogenation step 1000 to provide an iso-paraffins stream 12. The isoparaffins stream 12 is used as a feed to the isolation unit 300.

In addition, any light paraffins in the feed to the oligomerization reactor 500 will be unconverted and may optionally be recovered from the oligomerization reactor 500 as a light paraffins feed 13 and used as a feed to the dehydrogenation step 1100 to provide a light olefins stream 14. The light olefins stream 14 is recycled to the oligomerization reactor 500 to provide additional iso-olefins feed 10.

In the block diagram of the FIGURE, the process of the present invention is practiced in continuous operation. However, it is possible to practice the present invention in batch operation.

Feedstocks for the Fischer-Tropsch Reaction

The preferred feedstock for use in generating syngas is methane and/or ethane, preferably derived from natural gas or recycled methane and/or ethane from various stages in the process described herein. Heavier hydrocarbons tend to coke up the syngas generator, and are not preferred. In addition to methane and ethane, natural gas includes some heavier hydrocarbons ($C_{3-5}$ alkanes) and other impurities, e.g., carbon dioxide, nitrogen, helium, water and non-hydrocarbon acid gases. The methane and ethane can be isolated from the $C_{3+}$ alkanes and other impurities to provide a feedstock rich in methane and ethane, for example, using demethanizer and deethanizer columns.

The presence of sulfur, nitrogen, halogen, selenium, phosphorus, mercury and arsenic contaminants in the feedstock is undesirable. For this reason, it is preferred to remove sulfur and other contaminants from the feed before performing the Fischer-Tropsch chemistry. Means for removing these contaminants are well known to those of skill in the art. For example, ZnO guardbeds are preferred for removing sulfur impurities. Means for removing other contaminants are well known to those of skill in the art.

Demethanizers and other means for removing methane are well known to those of skill in the art. Demethanizer columns, which include one or more distillation towers, are typically used to separate methane and other more volatile components from ethane and less volatile components. High pressure demethanizers typically operate at pressures higher than 2.758 MPa (400 psi) and can produce overhead reflux by condensation against a pure component ethylene refrigeration. Demethanizer overhead temperatures of these systems are typically in the range of −85° C. to −100° C. Ethylene refrigeration at approximately −101° C. is typically used for chilling the overhead condenser. At pressures below 2.758 MPa, the overhead temperature is typically too low to use ethylene refrigeration unless a vacuum suction is used. However, that is not preferable due to potential air leakage into the system.

Methods for removing ethane from an alkane fraction are well known to those of skill in the art, and generally involve using a deethanizer. Ethane is preferably separated from propane and less volatile components. The ethane can be sent directly to the syngas generator to form syngas.

Syngas Generation

Syngas generators and their use with methane and ethane as feedstocks are well known to those of skill in the art. Any nitrogen and/or helium present in the methane and ethane-containing feedstock can be tolerated in the syngas generator. Depending on the exact nature of the source of the syngas feedstock, the feedstock may include heteroatom-containing impurities. However, these impurities should be removed from the feedstock before it is sent to the syngas generator. These impurities may be removed, for example, by hydrotreatment, selective adsorption, and the like.

Fischer-Tropsch Chemistry

In the Fischer-Tropsch synthesis process, liquid and gaseous hydrocarbons are formed by contacting a syngas with a Fischer-Tropsch catalyst under suitable temperature and pressure reactive conditions. According to the present invention, the Fischer-Tropsch reaction is conducted under low temperature Fischer Tropsch reaction conditions.

In typical Fischer Tropsch processes, the reaction is conducted at temperatures of about from 300 to 700° F. (149 to 371° C.) preferably about from 400° to 550° F. (204° to 228° C.); pressures of about from 10 to 600 psia, (0.7 to 41 bars) preferably 30 to 300 psia, (2 to 21 bars) and catalyst space velocities of about from 100 to 10,000 cc/g/hr., preferably 300 to 3,000 cc/g/hr.

The products of a typical Fischer Tropsch process range from $C_1$ to $C_{200}$+ with a majority in the $C_5$–$C_{100}$+ range. The reaction may be conducted in a variety of reactor types for example, fixed bed reactors containing one or more catalyst beds, slurry reactors, fluidized bed reactors, or a combination of different type reactors. Such reaction processes and reactors are well known and documented in the literature. Slurry Fischer-Tropsch processes utilize superior heat (and mass) transfer characteristics for the strongly exothermic synthesis reaction and are able to produce relatively high molecular weight, paraffinic hydrocarbons when using a cobalt catalyst. In a slurry process, a syngas comprising a mixture of $H_2$ and CO is bubbled up as a third phase through a slurry in a reactor which comprises a particulate Fischer-Tropsch type hydrocarbon synthesis catalyst dispersed and suspended in a slurry liquid comprising hydrocarbon products of the synthesis reaction which are liquid at the reaction conditions. The mole ratio of the hydrogen to the carbon monoxide may broadly range from about 0.5 to 4, but is more typically within the range of from about 0.7 to 2.75 and preferably from about 0.7 to 2.5. A particularly preferred Fischer-Tropsch process is taught in EP0609079, also completely incorporated herein by reference for all purposes.

Suitable Fischer-Tropsch catalysts comprise one or more Group VIII catalytic metals such as Fe, Ni, Co, Ru and Re. Additionally, a suitable catalyst may contain a promoter. Thus, a preferred Fischer-Tropsch catalyst comprises effective amounts of cobalt and one or more of Re, Ru, Pt, Fe, Ni, Th, Zr, Hf, U, Mg and La on a suitable inorganic support material, preferably one which comprises one or more refractory metal oxides. In general, the amount of cobalt present in the catalyst is between about 1 and about 50 weight percent of the total catalyst composition. The catalysts can also contain basic oxide promoters such as $ThO_2$, $La_2O_3$, MgO, and $TiO_2$, promoters such as $ZrO_2$, noble metals (Pt, Pd, Ru, Rh, Os, Ir), coinage metals (Cu, Ag, Au), and other transition metals such as Fe, Mn, Ni, and Re. Support materials including alumina, silica, magnesia and titania or mixtures thereof may be used. Preferred supports for cobalt containing catalysts comprise titania. Useful catalysts and their preparation are known and illustrative, but nonlimiting examples may be found, for example, in U.S. Pat. No. 4,568,663.

According to the present invention, the Fischer-Tropsch reaction is conducted under low temperature Fischer Tropsch reaction conditions. Low Temperature Fischer-Tropsch synthesis is distinguished from the broader Fischer-Tropsch synthesis by selection of the operating temperature to below 300° C. Operation at lower temperatures reduces methane formation and favors formation of higher molecular weight species such as wax. Preferably the Low Temperature Fischer-Tropsch synthesis is done in a bubble slurry reactor. The bubble slurry reactor is typically operated at temperatures within the range of 150–300° C., preferably 185 to 265° C. and more preferably 210–230° C. and pressures within the range of 1 to 70 bar, preferably 6–35 bar and most preferably 10 to 30 bar (1 bar=14.5 psia). Typical synthesis gas linear velocity ranges in the reactor from about 2 to 40 cm per sec. preferably 6 to 10 cm per sec. Additional details regarding bubble column slurry reactors can, for example, be found in Y. T. Shah et al., Design Parameters Estimations for Bubble Column Reactors, AIChE Journal, 28 No. 3 pp. 353–379 (May 1982); Ramachandran et al., Bubble Column Slurry Reactor, Three-Phase Catalytic Reactors Chapter 10, pp. 308–332 Gordon and Broch Science Publishers (1983); Deckwer et al., Modeling the Fischer-Tropsch Synthesis in the Slurry Phase, Ind. Eng. Chem. Process Des. Dev. v 21, No. 2, pp. 231–241 (1982); Kölbel et al., The Fischer-Tropsch Synthesis in the Liquid Phase, Catal. Rev.-Sci. Eng., v. 21 (n), pp. 225–274 (1980) and U.S. Pat. No. 5,348,982, all of which are hereby incorporated by reference in their entirety. Preferably the catalyst used in the Low Temperature Fischer Tropsch reactor does not promote the water gas shift reaction. Catalysts of this type include cobalt. Catalysts which promote the water gas shift reaction, and which are less desirable, include iron or nickel.

Certain catalysts are known to provide relatively high chain growth probabilities, and the reaction products include a relatively low proportion of low molecular ($C_{2-8}$) weight olefins and a relatively high proportion of high molecular weight ($C_{20+}$) paraffins. Such catalysts are well known to those of skill in the art and can be readily obtained and/or prepared. Catalysts with high chain growth probabilities (i.e., an alpha value greater than about 0.800) are preferred. Catalysts of this type include cobalt catalysts. The overall process including the Paragon™ process and olefin oligomerization can efficiently convert the high molecular weight waxy products to distillate fuel. Also, catalysts with high chain growth probabilities tend to produce less methane than catalysts with low chain growth probabilities, increasing the overall yield of distillate fuel.

Catalysts with High Chain Growth Probabilities

Preferably, the Fischer-Tropsch reaction of the present invention is conducted with a catalyst that provides relatively high chain growth probabilities to provide a hydrocarbon product stream comprising substantially ($C_{20+}$) waxy paraffins. Preferably, the catalyst is a cobalt-containing catalyst. Ruthenium is also an effective high chain growth Fischer-Tropsch catalyst; however, it tends to be more expensive.

In the Fischer Tropsch process of the present invention, the amount of cobalt present in the catalyst is preferably between about 1 and about 50 weight percent of the total catalyst composition, more preferably between about 10.0 and 25 weight percent.

Preferably, the catalyst utilized in the present invention contains between about 3 and 60 ppw cobalt, between 0.1 and 100 ppw of at least one of zirconium, titanium or chromium per 100 ppw of support (typically, silica, alumina, or silica-alumina and mixtures thereof).

In the processes of the present invention, the catalysts may have a particle size of between 10 and 110 microns, preferably between 20 and 80 microns, more preferably between 25 and 65 microns, and have a density of between 0.25 and 0.9 g/cc, preferably between 0.3 and 0.75 g/cc.

Catalyst Supports

The type of catalyst support utilized with the Fischer Tropsch catalyst may also influence methane production. According to the present invention, metal oxide supports or matrices may be used which may help to minimize methane production. Suitable metal oxide supports that may be used to minimize methane production include alumina, titania, silica, magnesium oxide, alkaline earth titanates, alkali titanates, rare earth titanates and mixtures thereof.

According to the present invention, supported ruthenium catalysts may be used to help decrease methane production. In this regard, titania or titania-containing supports may provide lower methane production than, for example, silica, alumina or manganese oxide supports. Accordingly, titania and titania-containing supports are preferred in the processes of the present invention.

Promoters and Noble Metals

The choice of promoter utilized with the Fischer Tropsch catalyst may also influence methane production. By way of example, alkali metal promoters may reduce the methane formation of iron catalysts.

In addition, noble metals, such as ruthenium, supported on inorganic refractory oxide supports, exhibit superior hydrocarbon synthesis characteristics with relatively low methane production. When a noble metal is used, platinum and palladium are generally preferred as the support. Accordingly, alkali metal promoters and/or noble metals may be included in the catalyst bed of the present invention.

Furthermore, confining the metals to the outer surface of the catalyst particles limits methane formation. Thus, surface supported cobalt catalysts (as described in, for example, U.S. Pat. No. 5,545,674) provide reduced methane formation.

Operating Conditions

Fischer-Tropsch reactions of the present invention are designed to produce hydrocarbon product stream comprising substantially $C_{20}+$ waxy products. Accordingly, the Fischer Tropsch reaction of the present invention are conducted under low temperature conditions and are typically conducted in either a fixed bed reactor or a slurry reactor, with slurry reactors being preferred. The operating temperature of the fixed bed reactor is between about 200° C. and 225° C., and the operating temperature of the slurry reactor is between about 225° C. and 250° C., with a temperature around 240° C. preferred.

Typical syngas linear velocity ranges in the reactor are from about 2 to 40 cm per sec., preferably from about 6 to 10 cm per sec. The pressure is preferably between about 1 and 30 ATM, with pressures between 20 and 30 ATM being particularly preferred. Above about 30 ATM, carbonyls may be formed and, therefore, pressures significantly above 30 ATM are not preferred. Further, the rate of reaction tends to increase with increased pressure, but tends to level off due to hydrodynamic problems at around 30 ATM.

The catalyst space velocities are typically between about 100 and 10,000 cc/g/h, preferably between about 300 and 3,000 cc/g/h, for both stages.

As discussed above, slurry reactors may be preferred for the Fischer-Tropsch reaction of the present invention. Bubble column slurry reactors may be particularly preferred.

Since the catalyst metal may be present in the catalyst in the form of an oxide, the catalyst may be reduced with hydrogen prior to contact with the slurry liquid. The starting slurry liquid is typically a heavy hydrocarbon with a viscosity sufficient to keep the catalyst particles suspended (typically between 4 and 100 centistokes at 100° C.). The slurry liquid also has a low enough volatility to avoid vaporization during operation (typically an initial boiling point range of between about 350° C. and 550° C.). The slurry liquid is preferably essentially free of contaminants such as sulfur, phosphorous or chlorine compounds. Initially, it may be desirable to use a synthetic hydrocarbon fluid such as a synthetic olefin oligomer as the slurry fluid.

Often, a paraffin fraction of the product having the desired viscosity and volatility is recycled as the slurry liquid. The slurry typically has a catalyst concentration of between about 2 and 40 percent catalyst, preferably between about 5 and 20 percent, and more preferably between about 7 and 15 percent catalyst based on the total weight of the catalyst, i.e., metal plus support.

The Fischer Tropsch reaction process of the present invention conducted under low temperature conditions reduces methane formation. According to the present invention, the hydrocarbon product stream from the Fischer Tropsch reaction process comprises low levels of methane, preferably less than 10% methane, more preferably less than 5% methane, and most preferably less than 2% methane. Yields of methane above 10% are economically unacceptable.

Although the reactions described herein are described in terms of Fischer-Tropsch reactions, they can optionally be performed using various modifications of the literal Fischer-Tropsch process where hydrogen (or water) and carbon monoxide (or carbon dioxide) are converted to hydrocarbons (e.g., paraffins, ethers, etc.) provided that the hydrocarbon product stream from the process comprises low levels of methane, preferably less than 10% methane. Thus, the term Fischer-Tropsch type product or process is intended to apply to Fischer-Tropsch processes and products and the various modifications thereof and the products thereof. For example, the term is intended to apply to the Kolbel-Engelhardt process typically described by the reaction:

The carbon dioxide can be returned to the syngas generator and combined with methane and air to form more syngas.

The Separation of Products from the Fischer-Tropsch Reaction

As discussed above, the Fischer-Tropsch reaction of the present invention yields a product stream comprising a mixture of water, methane, ethane, unconverted syngas, carbon dioxide and hydrocarbons. Also as discussed above, the hydrocarbons comprise substantially waxy hydrocarbons. The remaining portion of the hydrocarbons may comprise varying amounts of a $C_{3-5}$ olefin fraction, a distillate fuel fraction, and a naphtha fraction. Also as discussed above, the product stream comprises low levels of methane, preferably less than 10% methane, more preferably less than 5% methane, and most preferably less than 2% methane.

In the processes of the present invention, water, carbon dioxide, and unconverted syngas are preferably removed from the product stream. Carbon dioxide can be selectively removed from unconverted syngas, for example, using membrane separation technology. Methane and ethane are preferably bled off to a syngas generator and recycled.

A number of hydrocarbon fractions may be isolated from the product stream, using, for example, a high pressure and/or lower temperature vapor-liquid separator or low pressure separators or a combination of separators.

A $C_{2-}$ fraction can be isolated via conventional distillation techniques and recycled to the Fischer Tropsch reactor or optionally to the syngas generator. A $C_{3-5}$ olefin fraction can be isolated and oligomerized to form distillate fuel, preferably in combination with the $C_{3-5}$ olefins derived from the Paragon™ process.

Naphtha and distillate fuel fractions can be isolated and either used directly in fuel compositions or subjected to additional process steps such as hydrotreatment and/or isomerization. Catalysts and methods for hydrotreating and isomerizing hydrocarbons are well known to those of skill in the art.

The remaining waxy product fractions tend to have boiling points above about 650° F., preferably in the range of about 650° F. –1200° F. after removing particulate catalyst fines, and may include one or more fractions boiling above about 1200° F. These waxy fractions may be isolated from the lighter fractions using techniques known to those of skill in the art.

The waxy fractions primarily contain $C_{20}$ to $C_{50}$ linear paraffins with relatively small amounts of higher boiling branched paraffins. The fractions may be separated by fractional distillation or, preferably, are kept together as one waxy fraction and converted to an olefin-rich product stream using an olefin-selective paraffin cracking process, preferably in a Paragon reactor. These fractions may optionally be hydrotreated to remove any oxygenated products before the fractions are subjected to the olefin-selective paraffin cracking process and to the oligomerization step as discussed in detail below.

Hydrotreatment

Catalysts useful for hydrotreating the various fractions are well known in the art. Suitable catalysts include noble metals from Group VIIIA, such as platinum or palladium on an alumina or siliceous matrix, and Group VIIIA and Group VIB, such as nickel-molybdenum or nickel-tin on an alumina or siliceous matrix.

The non-noble metal (such as nickel-molybdenum) hydrogenation metal are usually present in the final catalyst composition as oxides, or more preferably or possibly, as sulfides when such compounds are readily formed from the particular metal involved. Preferred non-noble metal catalyst compositions contain in excess of about 5 weight percent, preferably about 5 to about 40 weight percent molybdenum and/or tungsten, and at least about 0.5, and generally about 1 to about 15 weight percent of nickel and/or cobalt determined as the corresponding oxides. The noble metal (such as platinum) catalyst contains in excess of 0.01 percent metal, preferably between 0.1 and 1.0 percent metal. Combinations of noble metals may also be used, such as mixtures of platinum and palladium.

Isomerization Chemistry

Isomerization of the paraffinic products from the Fischer-Tropsch reaction, including the distillate fuel fraction and the naphtha fraction, provide products with more branched paraffins, thus improving their octane values and lowering the pour point. Isomerization processes are generally carried out at temperatures between 200° F. and 700° F., preferably 300° F. to 550° F., with a liquid hourly space velocity between 0.1 and 2, preferably between 0.25 and 0.50. The hydrogen content is adjusted such that the hydrogen to hydrocarbon mole ratio is between 1:1 and 5:1. Catalysts useful for isomerization are generally bifunctional catalysts comprising a hydrogenation component, (preferably selected from the Group VIII metals of the Periodic Table of the Elements, and more preferably selected from the group consisting of nickel, platinum, palladium and mixtures thereof) and an acid component. Examples of an acid component useful in the preferred isomerization catalyst include a crystalline zeolite, a halogenated alumina component, or a silica-alumina component. Such paraffin isomerization catalysts are well known in the art.

Olefin-Selective Paraffin Cracking Process

The chain length of the waxy hydrocarbons can be shortened using an olefin-selective paraffin cracking process, preferably in a Paragon reactor. According to the present invention, a Paragon reactor may be used to convert waxy hydrocarbons to olefins. Catalysts and conditions for performing an olefin-selective paraffin cracking process in a Paragon reactor in general are well known to those of skill in the art, and are described, for example, in U.S. Pat. Nos. 4,502,945; 4,436,614; 4,390,413; 4,282,085; and 4,251,348, the contents of which are hereby incorporated by reference.

The Paragon reactor is capable of producing olefins from a paraffinic feedstock comprising normal paraffins, slightly branched paraffins and mixtures thereof. The conversion of the paraffinic feedstock to olefins is accomplished by contacting the paraffinic feedstock with a catalyst under conditions that convert the paraffins to predominantly $C_{3-5}$ olefins.

An example of a typical conversion is shown below with respect to a $C_{40}$ paraffin. Similar conversions occur for other paraffins of different molecular weights.

$$C_{40}H_{82} \rightarrow 2C_3H_6 + 4C_4H_8 + 3C_5H_{10} + C_3H_8$$

The products from the reaction are in a distribution that is determined mainly by thermodynamics. The products tend to include traces of ethylene (it is not thermodynamically favored), propylene, butenes, and $C_{5+}$ olefins. As the pressure drops, the yield of $C_{3-5}$ olefins increases. The yield and types of olefins can be adjusted by varying the temperature and pressure of the reaction. Since the olefin product stream is an equilibrium mixture, undesired olefins can be recycled to the reactor and converted to desired olefins. For example, if the desired product stream is propylene, butenes and higher olefins can be recycled, optionally to extinction, to yield additional propylene. Any small amount of $C_{3-5}$ paraffins produced in the reaction mixture will be largely inert, and it may be desirable to separate the inert paraffins from the olefins at some point in the overall process.

The reaction is conducted under olefin-producing reaction conditions, which typically involve pressures above 30 psig, preferably between about 45 psig and 2000 psig, and more preferably between about 50 psig and 500 psig. The pressure needs to be high enough to prevent excessive vaporization of the feed with corresponding high heat requirements in the furnace, but not too high that it will favor hydrogen transfer reactions between the olefins and other species to yield undesirable paraffins and aromatics. The temperatures typically range between about 625° F. and 800° F., preferably between about 650° F. and 750° F., and more preferably between 670° F. and 725° F. The temperature needs to be high enough to convert enough paraffins, but not too high to cause excessive formation of undesirable aromatics and diolefins. The liquid hourly space velocities typically are greater than 1 hr$^{-1}$, preferably between about 2 and 6 hr$^{-1}$, and more preferably between about 3 and 5 hr$^{-1}$.

According to the present invention, the feedstock to the Paragon reactor is the waxy hydrocarbon (i.e., $C_{20+}$) fraction from the low temperature Fischer-Tropsch reaction. If desired, this waxy fraction may be combined with hydrocarbons from other sources, such as gas oils, lubricating oil stocks, high pour point polyalphaolefins, foots oils, synthetic waxes such as normal alpha-olefin waxes, slack waxes, deoiled waxes and microcrystalline waxes. Foots oil is prepared by separating oil from the wax, where the isolated oil is referred to as foots oil. Preferably, the boiling point of the feedstock for the Paragon reactor is above that of distillate fuel and below about 1200° F.

The presence of nitrogen compounds in the feed for the Paragon reactor tends to lead to a reduction of the catalyst's activity and a shortening of the run life. For this reason, it is preferred that the total feed nitrogen be reduced to less than about 10 ppm by weight, preferably less than about 2 ppm by weight, and more preferably less than about 1 ppm by weight total nitrogen. It is also preferred that the feed have a sulfur content of less than about 1000 ppm by weight organic sulfur, and preferably less than about 500 ppm by weight organic sulfur. It is further preferred that the feed for the Paragon reactor have a minimal methane content. Therefore, it has been discovered that the waxy products from a low temperature Fischer-Tropsch reaction are an ideal feedstock for the Paragon reactor, since they contain relatively low levels of methane, organonitrogen and organosulfur compounds.

The catalyst typically includes an intermediate pore size, silicaceous crystalline molecular sieve. There is a relationship between the pressure in the reaction zone and the aluminum content of the molecular sieve that gives a region of highly preferred olefin-producing activity. The conditions in the reaction zone can include standard hydroprocessing temperatures and flow rates. The pressure, however, can range from about 30 psia to about 2000 psig, preferably from about 45 psia to about 2000 psig, and most preferably from about 50 psia to about 500 psig. It is preferred that the pressure in the Paragon reactor is close to that used in the subsequent oligomerization step (about 100 psig), to avoid compression of the gases.

The catalysts are typically exchanged to have at least a portion of the sites in the H$^+$ form during use (may be NH$^{4+}$ prior to use which converts to H⁺ during use). The catalysts are typically bound with an inert suppor, such as alumina or silica. Metals, such as Group VIII typically are not present, but may be included to assist in regeneration, and if a metal is used, the metal is typically Ni.

The activity and stability of the catalyst may be specified by use of the Constraint Index test as described in U.S. Pat. No. 4,016,218. As a measure of activity, the catalysts have a constraint index (CI) conversion at 10 minutes of greater than 20% at 800° F., preferably a CI conversion at 10 minutes of greater than 20% at 700° F., and more preferably a CI conversion at 10 minutes of greater than 40% at 600° F. As a measure of stability, the catalysts have a decline in % CI conversion from 180/10 minutes of less than 30, preferably less than 20, and more preferably less than 10.

The catalyst typically has a silica:alumina mole ratio from about 15:1 to about 500:1 and which preferably has little or no hydrogenation activity. Preferably the catalysts are zeolites with a silica:alumina ratio of greater than 25:1. More preferably the catalysts are 10-ring containing zeolites with a silica:alumina ratio of 25:1 to 500:1. Within thee ranges of silica:alumina, catalysts with long run lives and high olefin production rates may be achieved. Catalysts must be chosen so that they do not coke too rapidly and thus have unacceptably short run lives. ZSM-5 and ZSM-11 are preferred catalysts.

By "intermediate pore size silicaceous crystalline molecular sieve," as used herein, is meant two classes of silica-containing crystalline materials. The first class includes materials that, in addition to silica, contain significant amounts of alumina. These crystalline materials are usually called "zeolites," i.e., crystalline aluminosilicates. The second class of materials is essentially alumina-free silicates. These crystalline materials can include crystalline silica polymorphs, e.g., silicalite, chromia silicates, e.g., CZM, and ferrosilicates. ZSM-5 and ZSM-11 are preferred materials. The zeolites should be substantially in the H⁺ ion exchange form, that is, substantially free of sodium, potassium and other alkali metal and alkali earth ions.

All of these materials have the ability to sort molecules based on their size and/or shape. The larger pore size materials will admit larger molecules than the smaller pore size materials. Intermediate pore size silicaceous crystalline molecular sieves have the unique characteristics of being able to differentiate between large molecules and molecules containing quaternary carbon atoms on the one hand, and smaller molecules on the other hand. Thus, the intermediate pore size materials have surprising catalytic selectivities by reason of their effective pore apertures, as well as highly desirable and surprising catalytic activity and stability when compared to the larger pore size crystalline molecular sieves.

By "intermediate pore size" as used herein is meant an effective pore aperture in the range of about 5 to 6.5 Angstroms when the molecular sieve is in the H-form. Molecular sieves having pore apertures in this range tend to have unique molecular sieving characteristics. Unlike small pore size zeolites such as erionite and chabazite, they will allow hydrocarbons having some branching into the molecular sieve void spaces. Unlike larger pore size zeolites such as the faujasites, they can differentiate between n-alkanes and slightly branched alkanes on the one hand and larger branched alkanes having, for example, quaternary carbon atoms.

The effective pore size of the molecular sieves can be measured using standard adsorption techniques and hydrocarbonaceous compounds of known minimum kinetic diameters.

Intermediate pore size molecular sieves in the H-form will typically admit molecules having kinetic diameters of 5.0 to 6.5 Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular sieve, but do not penetrate as quickly and in some cases are effectively excluded. Compounds having kinetic diameters in the range of 6 to 6.5 Angstroms include: cyclohexane (6.0), 2,3-dimethylbutane (6.1), m-xylene (6.1), and 1,2,3,4-tetramethylbenzene (6.4). Generally, compounds having kinetic diameters of greater than about 6.5 Angstroms do not penetrate the pore apertures and thus are not absorbed into the interior of the molecular sieve lattice. Examples of such larger compounds include: hexamethylbenzene (7.1), 1,3,5-trimethylbenzene (7.5), and tributylamine (8.1).

The preferred effective pore size range is from about 5.3 to about 6.2 Angstroms. Among the materials falling within this range are the zeolite ZSM-5, the crystalline silica polymorph silicalite, RE 29,948 organosilicates, and the chromia silicate, CZM.

In performing adsorption measurements to determine pore size, standard techniques are used. It is convenient to consider a particular molecule as excluded if it does not fill at least 80% of the zeolite pore volume in less than about one hour (p/po=0.5; 25° C.).

Examples of intermediate pore size silicaceous crystalline molecular sieves include zeolites such as members of the ZSM series, e.g., ZSM-5, ZSM-11, ZSM-12, ZSM-21, ZSM-23, ZSM-35, ZSM-38, and ZSM-48. The intermediate pore size materials can include "crystalline admixtures" which are thought to be the result of faults occurring within the crystal or crystalline area during the synthesis of the zeolites. The "crystalline admixtures" are themselves zeolites but have characteristics in common, in a uniform or non-uniform manner, to what the literature reports as distinct zeolites. The crystalline admixtures are themselves intermediate pore size zeolites and are not to be confused with physical admixtures of zeolites in which distinct crystals or crystallites of different zeolites are physically present in the same catalyst composite or hydrothermal reaction mixtures.

The most preferred molecular sieves are those that have the crystal structure and exhibit the X-ray diffraction pattern characteristic of ZSM-5, ZSM-11, and their crystalline admixtures, silicalite, organosilicates, and the chromia silicate, CZM. These materials will have silica:alumina mole ratios of from about 150:1 to about 500:1, preferably from about 175:1 to about 300:1, and more preferably from about 210:1 to about 270:1. It can be appreciated that these mole ratios are higher than the typical "ZSM-5 zeolite" and lower than the typical "silicalite silicate."

The following Table I provides experimental data on catalysts of different structures.

TABLE I

| Zeolite | ZSM-11 | ZSM-5 | Beta | ZSM-12 | ZSM-12 | Y-Zeolite |
|---|---|---|---|---|---|---|
| Pore Size | 10-ring | 10-ring | 12-ring | 12-ring | 12-ring | 12-ring |
| Test No. | 2297 | 846 | 63 | 1695 | 2116 | 1087 |
| Temp., ° F. | 600 | 600 | 600 | 600 | 700 | 600 |
| Conv. @ 10 min | 97.9 | 44.1 | 95.6 | 7.8 | 83.7 | 84.9 |
| Conv. @ 430 min. | 98.1 | 41.7 | 16.6 | 4.5 | 16.9 | 31.5 |

TABLE I-continued

| Zeolite | ZSM-11 | ZSM-5 | Beta | ZSM-12 | ZSM-12 | Y-Zeolite |
|---|---|---|---|---|---|---|
| % drop in conversion | −0.2 | 5.4 | 82.6 | 42.3 | 79.8 | 62.9 |

The molecular sieve may be in any convenient form for ordinary fixed bed, fluidized bed or slurry use. It is preferably used in a fixed bed reactor and in a composite with a porous inorganic binder or matrix in such proportions that the resulting product contains from 1 to 95 percent by weight and preferably from 10 to 70 percent by weight of molecular sieve.

The terms "matrix" and "porous matrix" include inorganic compositions with which the molecular sieve can be combined, dispersed, or otherwise intimately admixed. The matrix should not be catalytically active in a cracking sense, i.e., it should contain substantially no acid sites, and it should have substantially no hydrogenation activity. The porosity of the matrix can either be inherent in a particular material or it can be caused by a mechanical or chemical means. Representative matrix materials include pumice, firebrick, diatomaceous earth and inorganic oxides. Representative inorganic oxides include alumina, silica, naturally occurring and conventionally processed clays, for example, attapulgite, sepiolite, bentonite, and kaolin. The preferred matrices have few, if any, acid sites and little or no cracking activity. Silica and alumina are especially preferred.

The compositing of the molecular sieve with the inorganic oxide matrix may be achieved by any suitable method wherein the sieve is intimately admixed with the oxide. Typical compositing procedures known to the art include co-gelling and co-mulling.

When operated at atmospheric pressure, the catalysts used in the Paragon reactor tend to have an extensive life (1000's of hours of operation). When operated above atmospheric pressure, the olefin products can react by hydrogen transfer to form coke, which can foul the catalyst. To avoid the coking reaction, the silica:alumina mole ratio of the (molecular sieve) catalyst may be maintained high, either by performing the synthesis at this value, or by post-synthesis modification (steaming and acid leaching).

Steaming and acid leaching can reduce hydrogen transfer, providing higher olefin yields and lowering fouling. If the catalyst fouls, it can be regenerated by oxidation burn using standard methods. Typically, volatile gases are removed in a stream of an inert gas such as nitrogen, the bed is heated, and oxygen is slowly introduced to the inert gas feed while monitoring the exotherms, at temperatures between about 800° F. and 1000° F.

The reactor operates at about 10–50% conversion of waxy paraffins in a single vessel. Operation at higher conversion will encounter an excessive drop in temperature since the reaction is endothermic. Operation at lower conversion is not economically desirable. If complete waxy paraffin conversion is desired, several vessels with intermediate re-heating may be employed, or the unreacted wax can be recycled back to the reactor.

The products of this reactor contain $C_3$ to $C_5$ olefins, and may contain smaller amounts of $C_{2-}$ and $C_{6+}$ products. Typically the yield of methane will be <2 wt %, most typically <1 wt %, and very most typically <0.5 wt %. These low methane yields are important because of the economic problems associated with the formation of methane in a GTL process.

The olefins from the process can be sold as such, especially the propylene. The can be sold as a C3=/C3 mixture (typically 65–80% C3=with the balance C3) or purified to higher levels. All or part of the olefins can be oligomerized to form additional distillate fuel.

The use of a non-acidic matrix is highly preferred for maximizing olefin production. The olefins produced in the Paragon reactor may be converted to distillate fuels in an oligomerization reaction, as discussed in more detail below. Alternatively, the olefins may be used in other processes. For example, propylene may be purified and used to form polypropylene or propylene oxide. Isobutylene may be used, for example, to form polymers or MTBE.

The olefins may need to be purified for sale, particularly if high purity olefins are desired. The olefins tend to contain small amounts of paraffins, and tend to contain very small quantities of heteroatom impurities. The acetylene and diolefin impurities are also relatively low, compared with FCC, cokers and ethane and EP crackers because of the relatively low temperature in the Paragon reactor. Methods for purifying olefins, as well as specifications for different grades for olefin products, are well known to those of skill in the art. Purification methods include fractional distillation, for example, using propane/propylene splitters to purify propylene. Methods for removing diolefins and acetylenes are also well known to those of skill in the art, and include hydrogenation, adsorption and extraction.

Oligomerization Conditions

Catalysts and reaction conditions for oligomerizing olefins such as the $C_{3-5}$ olefins primarily produced in the Paragon™ Process, as well as similar olefins produced in the Fischer-Tropsch reaction, are well known to those of skill in the art.

Any of the conditions known in the art for oligomerizing olefins may be used. In a particularly preferred embodiment, a $C_{3-5}$ olefins fraction is converted in a two-stage multiforming reaction to tetramers over a nickel-containing HZSM-5 zeolite catalyst. $C_{3-5}$ tetramers are very useful petrochemical feeds for making detergents such as alkylbenzene sulfonates, and for making high quality middle distillates such as jet fuel.

Other olefin dimerization, oligomerization and polymerization processes are well known in the art and may also be used. By way of example, phosphoric acid on an inert support, such as Keiselgur, may be used. It may also be possible to use conventional propylene polymerization processes with supported Cr catalysts, for example, $Cr/SiO_2$.

The preferred oligomerization process involves a high once-through conversion of the $C_{3-5}$ olefins from the Paragon™ process to the corresponding tetramer by contacting the olefins in the liquid form with Ni-HZSM-5 in a two-stage process. The first stage of the process converts the $C_{3-5}$ olefin feed to dimers, and the second stage of the process converts the dimer from the first stage to tetramer products with high selectivity. The product contains mostly olefin tetramers, and contains a relatively small amount of cracked products or paraffins. The olefinic feed to the Paragon reactor may also include unreacted light olefins from the Fischer Tropsch process.

The reaction conditions in the first reaction zone cause the olefins in the liquid state to oligomerize about 90% to 99% of the olefin to form an effluent which contains at least about 70% by weight dimer and preferably from about 75% to 80% by weight dimer. The first reaction zone can be operated at temperatures from about 80–200° F., pressures from about 400 psig to 1600 psig, and hourly space velocities of from about 0.5 to 2.

The feed to the second step of the process contains the normally liquid dimer olefins produced by the first step. The second step is operated so that the dimers produced in this second step are liquids under the conditions in that reaction zone. The second reaction zone can be operated at temperatures of from about 250–450° F., pressures from about 200 psig to 800 psig, and hourly space velocities from about 0.5 to 4. The once-through conversion to tetramer, based on starting olefins, can be 60% or more.

The tetramers are highly useful for both fuels and chemicals. As a fuel, the tetramers serve as extremely high quality mid-barrel fuels, such as jet fuel. These tetramers can also undergo chemical reactions to produce surfactants that can be used as additives in products such as lubricating oils. Among the most used surfactants prepared from the tetramers are alkyl sulfonates and alkyl benzene sulfonates.

Preferably, the olefin feed is in the liquid phase when it is contacted with the nickel-HZSM-5 crystalline molecular sieve. In this embodiment, the pressures and temperatures employed must be sufficient to maintain the system in the liquid phase. The pressure will therefore be a function of the feed olefin and the temperature.

The two-stage multi-forming process described herein may be carried out as a batch type, semi-continuous or continuous operation utilizing fixed or moving bed catalyst system.

The preferred nickel-containing HZSM-5 zeolite is a silicaceous crystalline molecular sieve of intermediate pore size. By "intermediate pore size" as used herein is meant an effective pore aperture in the range of about 5 to 6.5 Angstroms when the molecular sieve is in the H-form. Molecular sieves having pore apertures in this range tend to have unique molecular sieving characteristics. Unlike small pore zeolites such as erionite and chabazite, they will allow hydrocarbons having some branching into the molecular sieve void spaces. Unlike larger pore zeolites such as the faujasites and mordenites, they can differentiate between n-alkanes and slightly branched alkanes on the one hand and larger branched alkanes having, for example, quaternary carbon atoms.

The effective pore size of the molecular sieves can be measured using standard adsorption techniques and hydrocarbonaceous compounds of known minimum kinetic diameters.

Intermediate pore size molecular sieves in the H-form will typically admit molecules having kinetic diameters of 5.0 to 6.5 Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular sieve, but do not penetrate as quickly and in some cases are effectively excluded. Compounds having kinetic diameters in the range of 6 to 6.5 Angstroms include: cyclohexane (6.0), 2,3-dimethylbutane (6.1), m-xylene (6.1), and 1,2,3,4-tetramethylbenzene (6.4). Generally, compounds having kinetic diameters of greater than about 6.5 Angstroms do not penetrate the pore apertures and thus are not absorbed into the interior of the molecular sieve lattice. Examples of such larger compounds include: o-xylene (6,8), hexamethylbenzene (7.1), 1,3,5-trimethylbenzene (7.5), and tributylamine (8.1).

In performing adsorption measurements to determine pore size, standard techniques are used. It is convenient to consider a particular molecule as excluded if it does not reach at least 95% of its equilibrium adsorption value on the zeolite in less than about 10 minutes (p/po=0.5; 25° C.).

When synthesized in the alkali metal form, the ZSM-5 zeolite may be conveniently converted to the hydrogen form by well-known ion exchange reactions. This can involve intermediate formation of the ammonium form as a result of ammonium ion exchange and calcination of the ammonium form to yield the hydrogen form, or by treatment with an acid such as hydrochloric acid.

Nickel is incorporated into the silicaceous crystalline molecular sieve according to techniques well known in the art, for example, impregnation and cation exchange. For example, typical ion exchange techniques would be to contact the particular sieve in the hydrogen form with an aqueous solution of a nickel salt. Although a wide variety of salts can be employed, particular preference is given to chlorides, nitrates and sulfates. The amount of nickel in the zeolites range from 0.5% to 10% by weight and preferably from 1% to 5% by weight.

Following contact with the salt solution, the zeolites are preferably washed with water and dried at a temperature ranging from 150° F. to about 500° F. and thereafter heated in air at temperatures ranging from about 500° F. for periods of time ranging from 1 to 48 hours or more.

The nickel-containing HZSM-5 zeolite catalyst can be made substantially more stable for oligomerization by including from about 0.2% to 3% by weight and preferably 0.5% to 2% by weight of the Group IIB metals, zinc or cadmium and preferably zinc. A primary characteristic of these substituents is that they are weak bases and are not easily reduced. These metals can be incorporated into the catalysts using standard impregnation, ion exchange, etc., techniques. Strongly basic metals such as the alkali metals are unsatisfactory as they poison substantially all of the polymerization sites on the zeolite. For this reason, the alkali metal content of the zeolite is less than 1%, preferably less than 0.1%, most preferably less than 0.01%. The feed should include less than 100 ppm, more preferably less than 10 ppm, water. It should include less than 100 ppm, preferably less than 10 ppm, sulfur. Further, it should include less than 0.5%, preferably less than 0.05%, most preferably less than 0.01%, diolefins. Still further, it should include less than 5 ppm, preferably less than 1 ppm, most preferably less than 0.2 ppm, nitrogen.

The polymerization process is more efficient with small crystallite sieve particles than with larger crystalline particles. Preferably, the molecular sieve crystals or crystallites are less than about 10 microns, more preferably less than about 1 micron, most preferably less than about 0.1 micron in the largest dimension. Methods for making molecular sieve crystals in different physical size ranges are known to the art.

The molecular sieves can be composited with inorganic matrix materials, or they can be used with an organic binder. It is preferred to use an inorganic matrix since the molecular sieves, because of their large internal pore volumes, tend to be fragile, and to be subject to physical collapse and attrition during normal loading and unloading of the reaction zones as well as during the oligomerization processes. Where an inorganic matrix is used, it is preferred that the matrix be substantially free of hydrocarbon conversion activity.

Once the effluent from the oligomerization reaction zone is recovered, a number of further processing steps can be performed. If it is desired to use the long chain compounds directly as fuels, the tetramers can be hydrogenated.

All or part of the effluent of the second zone can be contacted with the molecular sieve catalyst in further reaction zones to further react the olefin tetramers with themselves to form still longer chain materials. Of course, the longer the carbon chain, the more susceptible the compound is to being cracked. Therefore, where successive oligomerization zones are used, the oligomerization zones must be operated under conditions that will not cause the oligomers to crack or engage in hydrogen transfer reactions. The most convenient, and preferred, method of operation where multiple reaction zones are used is to operate each zone under reaction conditions less severe than the preceding oligomerization zone. Operating with oligomerization zones in series with decreasing severity makes process control of the exothermic oligomerization reactions much easier.

Unconverted olefins from the first stage can be separated and recycled. In the same way, unconverted dimers from the second stage can also be recycled.

The products from the oligomerization reaction include highly branched iso-olefins with a size range of between $C_{12}$ and $C_{20}$ along with unconverted $C_{3-5}$ paraffins. Iso-olefins (and/or reduced iso-olefins) in the naphtha range from the oligomerization reaction will have a good octane number. Material in the jet and diesel ranges will have high smoke and cetane values. In addition, the jet freeze point and diesel cloud points will be low. The values for these properties are preferably within ATSM standards, for example, ASTM D 975 or diesel and D 1655 for jet fuel. The products should meet these standards due to their relatively high levels of iso-paraffins.

If the distillate fuels are to be saturated to reduce the olefins, syngas can be used, rather than hydrogen, to avoid the need for building a separate hydrogen plant on site. The carbon oxides remaining after the reduction can be recycled through the Fischer-Tropsch reactor. The hydrogenation (saturation) of the olefins can be done at several stages, including after the oligomerization step, after the products are isolated via distillation, or after the products are optionally blended with other components.

Optional Process Steps for the $C_{3-5}$ Paraffins $C_{3-5}$ paraffins may be isolated from the demethanization/ deethanization of natural gas, the Fischer-Tropsch reaction, the Paragon™ Process and/or the oligomerization reaction may be dehydrogenated to form olefins and combined with the feedstock to be provided to the oligomerization reactor. Catalysts and methods for dehydrogenating paraffins are well known to those of skill in the art.

The dehydrogenation catalyst usually will include a Group VIII metal, which includes iron, cobalt, nickel, palladium, platinum, rhodium, ruthenium, osmium, and iridium. Platinum and palladium or the compounds thereof are preferred, and platinum or a compound thereof is particularly preferred.

The process conditions selected for carrying out the dehydrogenation step will depend upon the dehydrogenation catalyst used. In general, the pressure is less than about 1000 psig. The temperature is typically between about 200° C. to about 800° C. with and LHSV of between 0.1 and 5.

Alternatively the paraffins can be subjected to molecular redistribution. The molecular redistribution reaction involves dehydrogenation of the paraffins to form olefins, methathesis of the olefins, and hydrogenation of the methathesized olefins. Dehydrogenation catalysts include those listed above. Olefin metathesis catalysts typically include one or more of a metal or the compound of a metal from Group VIB or Group VIIB of the Periodic Table of the Elements, which include chromium, manganese, molybdenum, rhenium and tungsten. Molybdenum, rhenium, tungsten, and compounds including these metals are preferred, and tungsten and compounds including tungsten are particularly preferred. The chemistry does not require using hydrogen gas, and therefore does not require relatively expensive recycle gas compressors. The chemistry is typically performed at mild pressures (100–5000 psig). The chemistry is typically thermoneutral and, therefore, there is no need for expensive internal reactor quench systems or interstage reheaters to control the temperature.

The product of the molecular redistribution of the $C_{3-5}$ paraffins includes ethane, unconverted $C_{3-5}$ paraffins and $C_{6+}$ products, each of which can be separately isolated.

Molecular redistribution is very sensitive to sulfur impurities in the feedstock, and these must be removed prior to the reaction. The presence of excess olefins and hydrogen in the disproportionation zone are also known to affect the equilibrium of the disproportionation reaction and to deactivate the catalyst. Since the composition of the fractions may vary, some routine experimentation will be necessary to identify the contaminants that are present and identify the optimal processing scheme and catalyst to use in carrying out the invention.

Optional Components

The products resulting from the. processes of the present invention are high value products and may include, for example, iso-olefins, distillate fuel additives, and distillate fuel compositions. By way of example, the olefins from the Paragon™ process may be oligomerized to from a hydrocarbon product comprising iso-olefins.

The hydrocarbon product may be distilled to provide distillate-boiling iso-olefins that may be added to a distillate fuel composition. Preferably at least a portion of the distillate fuel composition is prepared by a Fischer Tropsch process. In addition, the hydrocarbon product comprising iso-olefins may be utilized as a distillate fuel composition.

The distillate fuel compositions of the present invention may optionally include various additives, such as lubricants, emulsifiers, wetting agents, densifiers, fluid-loss additives, corrosion inhibitors, oxidation inhibitors, friction modifiers, demulsifiers, anti-wear agents, dispersants, anti-foaming agents, pour point depressants, detergents, rust inhibitors and the like. Examples of suitable lubricants include polyol esters of $C_{12}$–$C_{28}$ acids. Other hydrocarbons may be blended with the distillate fuel compositions of the present invention provided that the final blend has the necessary octane or cetane values, flash point, and toxicity properties. The total amount of additives is preferably between 1–30 percent. All percentages listed herein are weight percentages unless otherwise stated.

What is claimed is:

1. An integrated process for preparing iso-olefins from syngas, the process comprising:

(a) subjecting syngas to low temperature Fischer-Tropsch reaction conditions in the presence of a Fischer-Tropsch catalyst to form a hydrocarbon product stream comprising substantially waxy products;

(b) isolating the waxy products from the hydrocarbon product stream;

(c) subjecting the waxy products to an olefin-selective paraffin cracking process to form $C_{3-5}$ olefins; and (d) oligomerizing the $C_{3-5}$ olefins to form a hydrocarbon product comprising iso-olefins.

2. The process of claim 1, wherein the olefin-selective paraffin cracking process comprising contacting the waxy products with an intermediate pore size siliceous crystalline molecular sieve having a silica:alumina mole ratio from about 25:1 to about 500:1.

3. The process of claim 2, wherein the Fischer Tropsch catalyst comprises a catalyst which provides high chain growth probabilities.

4. The process of claim 3, wherein the catalyst comprises colbalt.

5. The process of claim 1, wherein the hydrocarbon product stream comprises less than 10 weight % methane.

6. The process of claim 1, wherein the hydrocarbon product stream comprises less than 5 weight % methane.

7. The process of claim 1, wherein the hydrocarbon product stream comprises less than 2 weight % methane.

8. The process of claim 1, further comprising the steps of: isolating a $C_{3-5}$ olefins fraction from the hydrocarbon product stream; blending the $C_{3-5}$ olefins fraction with the $C_{3-5}$ olefins of step (c) to form a blended $C_{3-5}$ olefins; and oligomerizing the blended $C_{3-5}$ olefins to form iso-olefins.

9. The process of claim 1, further comprising hydrogenating at least a portion of the iso-olefins of step (d) to form isoparaffins.

10. The process of claim 1, further comprising the step of distilling the hydrocarbon product of step (d) to provide distillate-boiling iso-olefins.

* * * * *